United States Patent
Kallianteris et al.

(10) Patent No.: US 10,995,676 B2
(45) Date of Patent: May 4, 2021

(54) PLANETARY GEAR DEVICE, GAS TURBINE ENGINE AND METHOD FOR MANUFACTURING A PLANETARY GEAR DEVICE

(71) Applicant: ROLLS-ROYCE DEUTSCHLAND LTD & CO KG, Blankenfelde-Mahlow (DE)

(72) Inventors: Christos Kallianteris, Berlin (DE); Jan Schwarze, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 16/543,057

(22) Filed: Aug. 16, 2019

(65) Prior Publication Data
US 2020/0088104 A1 Mar. 19, 2020

(30) Foreign Application Priority Data
Sep. 14, 2018 (DE) ...................... 10 2018 122 535.0

(51) Int. Cl.
*F02C 7/36* (2006.01)
*F16H 57/08* (2006.01)
*F16H 57/02* (2012.01)

(52) U.S. Cl.
CPC ............. *F02C 7/36* (2013.01); *F16H 57/082* (2013.01); *F05D 2230/644* (2013.01); *F05D 2260/40311* (2013.01); *F16H 2057/02043* (2013.01)

(58) Field of Classification Search
CPC ...................... F02C 7/36; F16H 57/082; F16H 2057/02043; F05D 2230/644; F05D 2260/40311
See application file for complete search history.

(56) References Cited

U.S. PATENT DOCUMENTS 4,700,583 A * 10/1987 Hicks .................... F16H 57/082
475/338
5,391,125 A 2/1995 Tura et al.
(Continued)

FOREIGN PATENT DOCUMENTS

DE 2049580 A1 9/1971
DE 102005007525 B3 8/2006
(Continued)

OTHER PUBLICATIONS

German Search Report dated Feb. 7, 2019 for related German Patent Application No. 10 2018 106 564.7.
(Continued)

*Primary Examiner* — Huan Le
(74) *Attorney, Agent, or Firm* — Shuttleworth & Ingersoll, PLC; Timothy Klima (57) ABSTRACT

A planetary gearbox device for a turbomachine, having a planet carrier and at least one planet gear arranged rotatably thereon, is described. The planet gear is arranged in the axial direction between two planet carrier regions, to each of which at least one carrier element, on which the planet gear is rotatably mounted, is connected for conjoint rotation therewith. A wedging sleeve is arranged between the carrier element and each of the planet carrier regions, by means of each of which wedging sleeves a press-fit joint is established between the carrier element and the planet carrier regions. A sleeve is provided radially between at least one of the wedging sleeves and a planet carrier region.

18 Claims, 7 Drawing Sheets

(56) References Cited

U.S. PATENT DOCUMENTS

| | | | |
|---|---|---|---|
| 5,863,272 A | 1/1999 | Anderson | |
| 2010/0077881 A1* | 4/2010 | Hicks | F16H 57/082 74/411 |
| 2013/0184114 A1 | 7/2013 | Norem et al. | |
| 2015/0105212 A1 | 4/2015 | Graham et al. | |
| 2017/0227115 A1 | 8/2017 | Smook et al. | |
| 2018/0031116 A1 | 2/2018 | Johnson | |
| 2018/0100573 A1* | 4/2018 | Madge | F16H 57/0479 |

FOREIGN PATENT DOCUMENTS

| | | |
|---|---|---|
| DE | 102010017463 A1 | 12/2011 |
| DE | 102012206257 A1 | 10/2013 |
| DE | 102014214295 A1 | 1/2016 |
| DE | 102016208440 A1 | 11/2017 |
| DE | 102018106564.7 | 3/2018 |
| EP | 3306140 A1 | 4/2018 |
| GB | 2409508 A | 6/2005 |
| GB | 1617033.4 | 10/2016 |

OTHER PUBLICATIONS

German Search Report dated Jul. 3, 2019 from counterpart German App No. 102018122535.0.

\* cited by examiner

PLANETARY GEAR DEVICE, GAS TURBINE ENGINE AND METHOD FOR MANUFACTURING A PLANETARY GEAR DEVICE

This application claims priority to German Patent Application DE102018122535.0 filed Sep. 14, 2018, the entirety of which is incorporated by reference herein.

The present disclosure relates to a planetary gearbox device for a turbomachine having a planet carrier and at least one planetary gear that is disposed rotatably on the planet carrier. The present disclosure furthermore relates to a method for producing a planetary gearbox device and to a gas turbine engine.

A planetary gearbox having a planet carrier and a carrier element connected firmly thereto is known from DE 10 2018 106 564.7 by the applicant, which is not a prior publication. At least one planet gear is rotatably mounted on the carrier element. The carrier element engages radially in a hole in the planet carrier. A wedging sleeve is provided radially between the planet carrier and the carrier element. The wedging sleeve is operatively connected, by means of an outer, substantially cylindrical lateral surface region, to a cylindrical surface of the hole in the planet carrier and, by means of an inner, conical lateral surface region, to an outer, conical lateral surface region of the carrier element.

It is the underlying object of the present disclosure to make available a planetary gearbox device which is distinguished by a long service life and is simple to assemble, as well as a gas turbine engine embodied with a planetary gearbox device of this kind. Moreover, the intention is to make available an easily implemented method for producing a planetary gearbox device of this kind.

According to a first aspect, a planetary gearbox device for a turbomachine having a planet carrier and at least one planet gear that is arranged rotatably on the planet carrier is provided. The planet gear is arranged in the axial direction between two planet carrier regions, to which at least one carrier element is connected for conjoint rotation therewith. The planet gear is rotatably mounted on the carrier element. A wedging sleeve is arranged between the carrier element and each of the planet carrier regions, by means of each of which wedging sleeves a press-fit joint is established between the carrier element and the planet carrier regions. In addition, a sleeve is provided radially between at least one of the wedging sleeves and a planet carrier region.

This ensures that, even where the planet carrier is of one-piece design, a diameter region of the carrier element, the diameter of which is greater than the diameter of the regions of the carrier element by means of which the carrier element engages in the planet carrier regions, can be installed axially between the two planet carrier regions.

This offers the possibility of using carrier elements of the same design both for a one-piece and for a multi-part embodiment of the planet carrier and thus of producing the planetary gearbox device with low production costs.

Provision can be made here for the wedging sleeve to be operatively connected, by means of an outer side, to an inner side of the sleeve, at least in some region or regions. The outer side of the wedging sleeve and the inner side of the sleeve can be matched to one another in such a way that installing the wedging sleeve between the sleeve and the carrier element is simplified and a joint for conjoint rotation between the planet carrier region and the carrier element can be ensured.

If the wedging sleeve is operatively connected, by means of an inner side, to an outer side of the carrier element, at least in some region or regions, and if the inner side of the wedging sleeve and the outer side of the carrier element are matched to one another, installation of the planetary gearbox device can once again be carried out in a simple manner, and the desired joint for conjoint rotation between the carrier element and the planet carrier can be produced to the required extent.

If the outer side and/or the inner side of the wedging sleeve are/is of tapered or cylindrical design, at least in some region or regions, the wedging sleeve can be positioned with low fitting forces between the sleeve and the carrier element.

The inner side of the sleeve can be of tapered or cylindrical design, at least in some region or regions, to enable installation of the sleeve and of the wedging sleeve to be carried out with low fitting forces.

According to another aspect, the sleeve is operatively connected, by means of an outer side, to an inner side of the planet carrier region, at least in some region or regions.

According to another aspect, an outside diameter of the end face of the sleeve is greater than the diameter of the end face of the carrier element, and at least that surface region of the end face of the sleeve which radially surrounds the end face of the carrier element is embodied with a non-sparking material.

The sleeve is thus embodied with an axial thrust surface for the planet gear rotatably mounted on the carrier element. In addition, the non-sparking material in the region of the thrust surface of the sleeve for the planet gear ensures that the formation of sparks is prevented when the planet gear or the bearing thereof is resting against the end face of the sleeve. This, in turn, reduces the risk of fire within a jet engine of an aircraft in a manner which is simple in terms of design.

If the sleeve rests by means of an end face against an end face of the carrier element between the planet carrier regions, at least in some region or regions, a load path during a process of insertion of the wedging sleeve between the sleeve and the carrier element is closed in a simple manner by the carrier element. Deformations or deflections of the planet carrier regions during the process of insertion of the wedging sleeve are thereby avoided or reduced in a manner which is simple in terms of design.

Depending on the respective use under consideration, provision can be made for the end face of the sleeve which is embodied with the non-sparking material and the end face of the sleeve by means of which the sleeve rests against the end face of the carrier element to be situated in a common axial plane. In addition, there is the possibility that the end face of the sleeve which interacts with the end face of the carrier element projects axially relative to the sleeve end face of smaller outside diameter provided as a thrust surface, and the sleeve is of stepped design in the region thereof which faces the end face of the carrier element.

In another embodiment of the planetary gearbox device, the sleeve has a radially outward-pointing annular collar, the outside diameter of which is greater than the diameter of the inner side of the planet carrier region, to which the outer side of the sleeve is operatively connected. In this case, in a manner which is simple in terms of design, the annular collar of the sleeve forms a stop in the axial direction, by means of which a movement of the sleeve in the axial direction of insertion of the sleeve into the planet carrier region is limited.

According to another aspect, the sleeve rests, by means of an end face of the annular collar which faces a side face of the planet carrier region, against the side face of the planet carrier region, as a result of which there is additionally an anti-rotation safeguard for the sleeve relative to the planet carrier region by virtue of the frictional engagement prevailing between the end face of the annular collar and the side face.

A positive joint can be provided between the end of the annular collar and the side face of the planet carrier region, by means of which positive joint a relative rotary motion between the planet carrier region and the sleeve is at least partially blocked.

For this purpose, provision can be made, for example, for the end of the annular collar to be provided with a projection, bead or the like, which projects beyond the end and engages in a corresponding recess in the side face of the planet carrier region with a corresponding clearance fit. The clearance fit ensures that the positive engagement between the sleeve and the planet carrier region can be produced in a simple manner during the assembly of the planetary gearbox device.

According to another aspect, the outside diameter of the outer side of the sleeve and the inside diameter of the inner side, interacting with the sleeve, of the planet carrier region are matched to one another in such a way that there is an interference fit before the installation of the wedging sleeve between the sleeve and the carrier region.

Here, the interference fit can be in the range between 10 μm and 40 μm, preferably 20 μm to 30 μm, e.g. 25 μm. This in turn ensures that the sleeve can be inserted with relatively low fitting forces into the planet carrier region and, on the other hand, is attached to the desired extent to the planet carrier region and remains in the installed position during the installation of the wedging sleeve.

According to another aspect, at least in some region or regions, the further wedging sleeve is operatively connected, by means of an outer side, to an inner side of a further sleeve or directly to an inner side of the associated planet carrier region. In addition, the outer side of the wedging sleeve and the inner side of the sleeve or the inner side of the planet carrier region are matched to one another. Thus, once again, installation of the sleeve and/or of the wedging sleeve can be carried out with relatively low fitting forces and the joint for conjoint rotation between the planet carrier and the carrier element can be established.

According to another aspect, assembly is simplified if the inner side of the further sleeve and/or the inner side of the planet carrier region are/is of tapered or cylindrical design, at least in some region or regions.

In further embodiments of the planetary gearbox device, the planet carrier is of one-piece or multi-part design.

As noted elsewhere herein, the present disclosure can relate to a gas turbine engine. Such a gas turbine engine can comprise an engine core which comprises a turbine, a combustion chamber, a compressor, and a core shaft that connects the turbine to the compressor. Such a gas turbine engine can comprise a fan (having fan blades) which is positioned upstream of the engine core.

Arrangements of the present disclosure can be particularly, although not exclusively, beneficial for fans that are driven via a gearbox. Accordingly, the gas turbine engine can comprise a gearbox that receives an input from the core shaft and outputs drive to the fan so as to drive the fan at a lower rotational speed than the core shaft. The input to the gearbox can be performed directly from the core shaft or indirectly from the core shaft, for example via a spur shaft and/or a spur gear. The core shaft can be rigidly connected to the turbine and the compressor, such that the turbine and the compressor rotate at the same rotational speed (wherein the fan rotates at a lower rotational speed). Here, the gear box can be embodied as a planetary gearbox device as described in greater detail above.

The gas turbine engine as described and claimed herein can have any suitable general architecture. For example, the gas turbine engine can have any desired number of shafts, for example one, two or three shafts, that connect turbines and compressors. Purely by way of example, the turbine connected to the core shaft can be a first turbine, the compressor connected to the core shaft can be a first compressor, and the core shaft can be a first core shaft. The engine core can further comprise a second turbine, a second compressor, and a second core shaft which connects the second turbine to the second compressor. The second turbine, the second compressor, and the second core shaft can be arranged so as to rotate at a higher rotational speed than the first core shaft.

In such an arrangement, the second compressor can be positioned so as to be axially downstream of the first compressor. The second compressor can be arranged so as to receive (for example directly receive, for example via a generally annular duct) flow from the first compressor.

The gearbox can be arranged so as to be driven by the core shaft (for example the first core shaft in the example above) that is configured to rotate (for example when in use) at the lowest rotational speed. For example, the gearbox can be arranged so as to be driven only by the core shaft (for example only by the first core shaft and not by the second core shaft in the example above) that is configured to rotate (for example when in use) at the lowest rotational speed. Alternatively thereto, the gearbox can be arranged so as to be driven by one or a plurality of shafts, for example the first and/or the second shaft in the example above.

In the case of a gas turbine engine which is described and claimed herein, a combustion chamber can be provided so as to be axially downstream of the fan and the compressor(s). For example, the combustion chamber can lie directly downstream of the second compressor (at the exit of the latter) when a second compressor is provided By way of further example, the flow at the exit of the compressor can be provided to the inlet of the second turbine, when a second turbine is provided. The combustion chamber can be provided so as to be upstream of the turbine(s).

The or each compressor (for example the first compressor and the second compressor as described above) can comprise any number of stages, for example multiple stages. Each stage can comprise a row of rotor blades and a row of stator vanes, the latter potentially being variable stator vanes (in that the angle of incidence of said stator vanes can be variable). The row of rotor blades and the row of stator blades can be axially offset from one another.

The or each turbine (for example the first turbine and the second turbine as described above) can comprise any number of stages, for example multiple stages. Each stage can comprise a row of rotor blades and a row of stator blades. The row of rotor blades and the row of stator blades can be axially offset from one another.

Each fan blade can be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip can be less than (or on the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip can be in an inclusive range delimited by two of the values in the previous sentence (that is to say that the values can form upper or lower limits).

These ratios can commonly be referred to as the hub-to-tip ratio. The radius at the hub and the radius at the tip can both be measured at the leading periphery (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centreline and the tip of the fan blade at the leading periphery of the latter. The diameter of the fan (which may simply be double the radius of the fan) can be larger than (or on the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter can be in an inclusive range delimited by two of the values in the previous sentence (that is to say that the values can form upper or lower limits).

The rotational speed of the fan can vary during use. Generally, the rotational speed is lower for fans with a comparatively large diameter. Purely by way of non-limiting example, the rotational speed of the fan at cruise conditions can be less than 2500 rpm, for example less than 2300 rpm. Purely by way of further non-limiting example, the rotational speed of the fan at cruise conditions for an engine having a fan diameter in the range from 250 cm to 300 cm (for example 250 cm to 280 cm) can also be in the range from 1700 rpm to 2500 rpm, for example in the range from 1800 rpm to 2300 rpm, for example in the range from 1900 rpm to 2100 rpm. Purely by way of further non-limiting example, the rotational speed of the fan at cruise conditions for an engine having a fan diameter in the range from 320 cm to 380 cm can be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular speed). The fan tip loading at cruise conditions can be more than (or on the order of): 0.3, 0.31, 0.32, 0.33, 0.34, 0.35, 0.36, 0.37, 0.38, 0.39, or 0.4 (wherein all units in this passage are $Jkg^{-1}K^{-1})/(ms^{-1})^2$). The fan tip loading can be in an inclusive range delimited by two of the values in the previous sentence (that is to say that the values can form upper or lower limits).

Gas turbine engines in accordance with the present disclosure can have any desired bypass ratio, wherein the bypass ratio is defined as the ratio of the mass flow rate of the flow through the bypass duct to the mass flow rate of the flow through the core under cruise conditions. In the case of some arrangements, the bypass ratio can be more than (or on the order of): 10, 10.5, 11, 11.5, 12, 12.5, 13, 13.5, 14, 14.5, 15, 15.5, 16, 16.5, or 17. The bypass ratio can be in an inclusive range delimited by two of the values in the previous sentence (that is to say that the values can form upper or lower limits). The bypass duct can be substantially annular. The bypass duct can be situated radially outside the engine core. The radially outer surface of the bypass duct can be defined by an engine nacelle and/or a fan casing.

The overall pressure ratio of a gas turbine engine as described and claimed herein can be defined as the ratio of the stagnation pressure upstream of the fan to the stagnation pressure at the exit of the highest pressure compressor (before the entry to the combustion chamber). By way of non-limiting example, the overall pressure ratio of a gas turbine engine as described and claimed herein at cruise can be greater than (or on the order of): 35, 40, 45, 50, 55, 60, 65, 70, 75. The overall pressure ratio can be in an inclusive range delimited by two of the values in the previous sentence (that is to say that the values can form upper or lower limits).

The specific thrust of a gas turbine engine can be defined as the net thrust of the gas turbine engine divided by the total mass flow through the engine. The specific thrust of an engine as described and/or claimed herein at cruise conditions can be less than (or on the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust can be in an inclusive range delimited by two of the values in the previous sentence (that is to say that the values can form upper or lower limits). Such gas turbine engines can be particularly efficient in comparison with conventional gas turbine engines.

A gas turbine engine as described and claimed herein can have any desired maximum thrust. Purely by way of a non-limiting example, a gas turbine as described and/or claimed herein can be capable of generating a maximum thrust of at least (or on the order of): 160 kN, 170 kN, 180 kN, 190 kN, 200 kN, 250 kN, 300 kN, 350 kN, 400 kN, 450 kN, 500 kN, or 550 kN. The maximum thrust can be in an inclusive range delimited by two of the values in the previous sentence (that is to say that the values can form upper or lower limits). The thrust referred to above can be the maximum net thrust at standard atmospheric conditions at sea level plus 15 degrees C. (ambient pressure 101.3 kPa, temperature 30 degrees C.) in the case of a static engine.

In use, the temperature of the flow at the entry to the high pressure turbine can be particularly high. This temperature, which can be referred to as TET, can be measured at the exit to the combustion chamber, for example directly upstream of the first turbine blade, which in turn can be referred to as a nozzle guide blade. At cruising speed, the TET can be at least (or on the order of): 1400K, 1450K, 1500K, 1550K, 1600K, or 1650K. The TET at cruising speed can be in an inclusive range delimited by two of the values in the previous sentence (that is to say that the values can form upper or lower limits). The maximum TET in the use of the engine can be at least (or on the order of), for example: 1700K, 1750K, 1800K, 1850K, 1900K, 1950K, or 2000K. The maximum TET can be in an inclusive range delimited by two of the values in the previous sentence (that is to say that the values can form upper or lower limits). The maximum TET can occur, for example, under a high thrust condition, for example under a maximum take-off thrust (MTO) condition.

A fan blade and/or an airfoil portion of a fan blade as described herein can be manufactured from any suitable material or a combination of materials. For example, at least a part of the fan blade and/or of the airfoil can be manufactured at least in part from a composite, for example a metal matrix composite and/or an organic matrix composite, such as carbon fibre. By way of a further example, at least a part of the fan blade and/or of the airfoil can be manufactured at least in part from a metal, such as a titanium-based metal or an aluminum-based material (such as an aluminum-lithium alloy) or a steel-based material. The fan blade can comprise at least two regions which are manufactured using different materials. For example, the fan blade can have a protective leading periphery, which is manufactured using a material that is better able to resist impact (for example of birds, ice, or other material) than the rest of the blade. Such a leading periphery can, for example, be manufactured using titanium or a titanium-based alloy. Thus, purely by way of example, the fan blade can have a carbon-fiber-based or aluminum-based body (such as an aluminum-lithium alloy) with a titanium leading periphery.

A fan as described herein can comprise a central portion from which the fan blades can extend, for example in a radial direction. The fan blades can be attached to the central portion in any desired manner. For example, each fan blade can comprise a fixing device which can engage with a corresponding slot in the hub (or disk). Purely by way of example, such a fixing device can be in the form of a dovetail that can be inserted into and/or engage with a corresponding slot in the hub/disk in order for the fan blade to be fixed to the hub/disk. By way of further example, the fan blades can be formed integrally with a central portion. Such an arrangement can be referred to as a blisk or a bling. Any suitable method can be used to manufacture such a blisk or such a bling. For example, at least a part of the fan blades can be machined from a block and/or at least a part of the fan blades can be attached to the hub/disk by welding, such as linear friction welding, for example.

The gas turbine engines as described and claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine engine as described and claimed herein can have any desired number of fan blades, for example 16, 18, 20, or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the gas turbine engine between end of climb and start of descent (in terms of time and/or distance).

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions can correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example in the region of 11,000 m. The cruise conditions can correspond to standard atmospheric conditions at any given altitude in these ranges.

Purely by way of example, the cruise conditions can correspond to the following: a forward Mach number of 0.8; a pressure of 23,000 Pa; and a temperature of −55 degrees C.

As used anywhere herein, "cruising speed" or "cruise conditions" can mean the aerodynamic design point. Such an aerodynamic design point (or ADP) can correspond to the conditions (including, for example, the Mach number, environmental conditions, and thrust requirement) for which the fan operation is designed. This can mean, for example, the conditions at which the fan (or the gas turbine engine) has optimum efficiency in terms of construction.

When in use, a gas turbine engine as described and claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

According to another aspect, a method for producing the planetary gearbox device described in greater detail above is proposed. In this method, a position of the inner side of the planet carrier region is determined and, if a deviation between the position determined and a predefined position is detected, the inner side and/or the outer side of the sleeve are/is produced in accordance with the deviation.

As a result, manufacturing tolerances in the region of the planet carrier can be compensated in a simple manner, and the production costs of the planetary gearbox device can be reduced with little effort in comparison with conventionally manufactured planetary gearbox devices. Furthermore, the more precise positioning of the planet gears relative to one another in the planet carrier enables the planetary gearbox device to be implemented with a lower component weight and to be operated with a higher efficiency since a desired rolling contact behavior can be ensured in the region of the tooth engagements of the planetary gearbox device.

A fitting force can be held constant or varied during the insertion of the sleeve into the planet carrier region and/or during the insertion of the wedging sleeve into the planet carrier region or into the sleeve.

The planet carrier region can be heated relative to an ambient temperature before the insertion of the sleeve and/or of the wedging sleeve, and/or the sleeve and/or the wedging sleeve can be cooled relative to the ambient temperature, to enable the sleeve and/or the wedging sleeve to be inserted with lower fitting forces.

Provision can furthermore be made for oil under pressure to be introduced between the outer side of the wedging sleeve and the inner side of the sleeve or the inner side of the planet carrier region and/or between the inner side of the wedging sleeve and the outer side of the carrier element during the insertion of the wedging sleeve between the planet carrier region and the carrier element or between the sleeve and the carrier element.

A person skilled in the art will understand that a feature or parameter which is described in relation to one of the above aspects can be applied with any other aspect, unless they are mutually exclusive. Moreover, any feature or any parameter which is described here can be applied with any aspect and/or can be combined with any other feature or parameter described here, unless they are mutually exclusive.

Embodiments will now be described by way of example with reference to the figures, in which.

Figure 1:
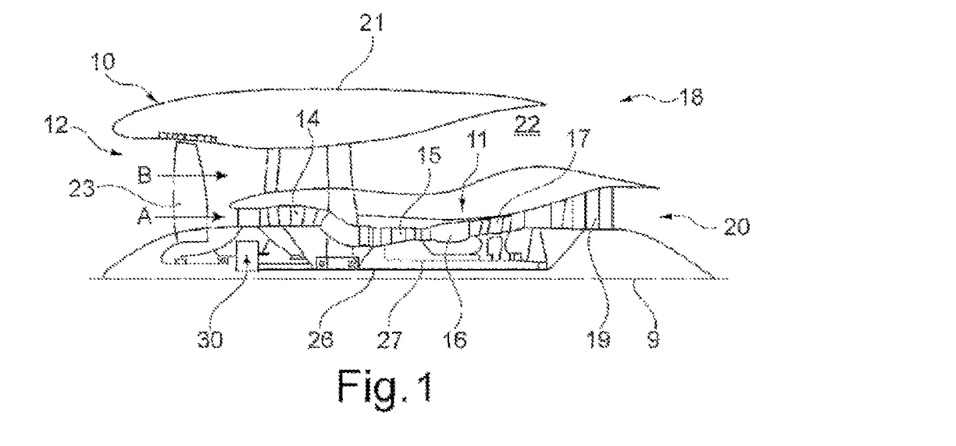
FIG. 1 shows a longitudinal section through a gas turbine engine.

FIG. 1 illustrates a gas turbine engine 10 or turbomachine with a primary axis of rotation 9. The engine 10 comprises an air intake 12 and a thrust fan 23 that generates two air flows: a core air flow A and a bypass air flow B. The gas turbine engine 10 comprises a core 11 or engine core which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low pressure turbine 19 by way of a shaft 26 and an epicyclic gearbox 30. In this context, the shaft 26 is also referred to as a core shaft or connecting shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being expelled through the nozzle 20 to provide some propulsive thrust. The high-pressure turbine 17 drives the high-pressure compressor 15 by way of a suitable connecting shaft or shaft 27, which is also referred to as the core shaft. The fan 23 generally provides the majority of the propulsion force. The epicyclic gearbox 30 is a reduction gearbox.

Figure 2:
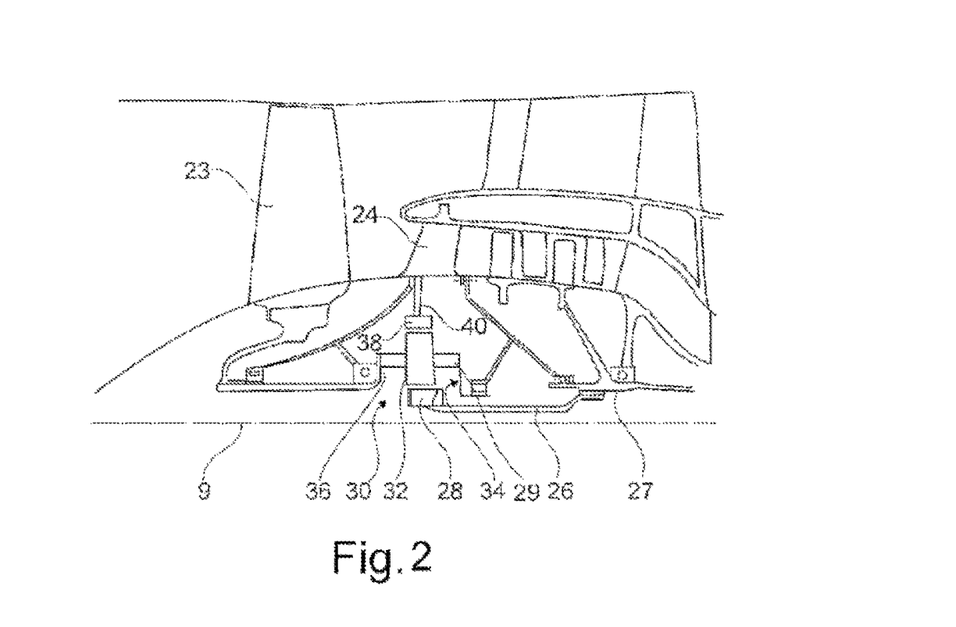
FIG. 2 shows an enlarged partial longitudinal sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gearbox assembly 30. A plurality of planet gears 32, which are coupled to one another by way of a planet carrier 34, are situated radially outside the sun gear 28 and mesh with the latter, and are in each case disposed so as to be rotatable on carrier elements 29 that are connected to the planet carrier 34 for conjoint rotation therewith. The planet carrier 34 limits the planet gears 32 to orbiting around the sun gear 28 in a synchronous manner while enabling each planet gear 32 to rotate about its own axis on the carrier elements 29. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary supporting structure 24.

It is noted that the terms "low-pressure turbine" and "low-pressure compressor" as used herein can be taken to mean the lowest-pressure turbine stage and the lowest-pressure compressor stage (that is to say not including the fan 23) respectively and/or the turbine and compressor stages that are connected to one another by the connecting shaft 26 with the lowest rotational speed in the engine (that is to say not including the gearbox output shaft that drives the fan 23). In some documents, the "low-pressure turbine" and the "low-pressure compressor" referred to herein can alternatively be known as the "intermediate-pressure turbine" and "intermediate-pressure compressor". Where such alternative nomenclature is used, the fan 23 can be referred to as a first compression stage or lowest-pressure compression stage.

Figure 3:
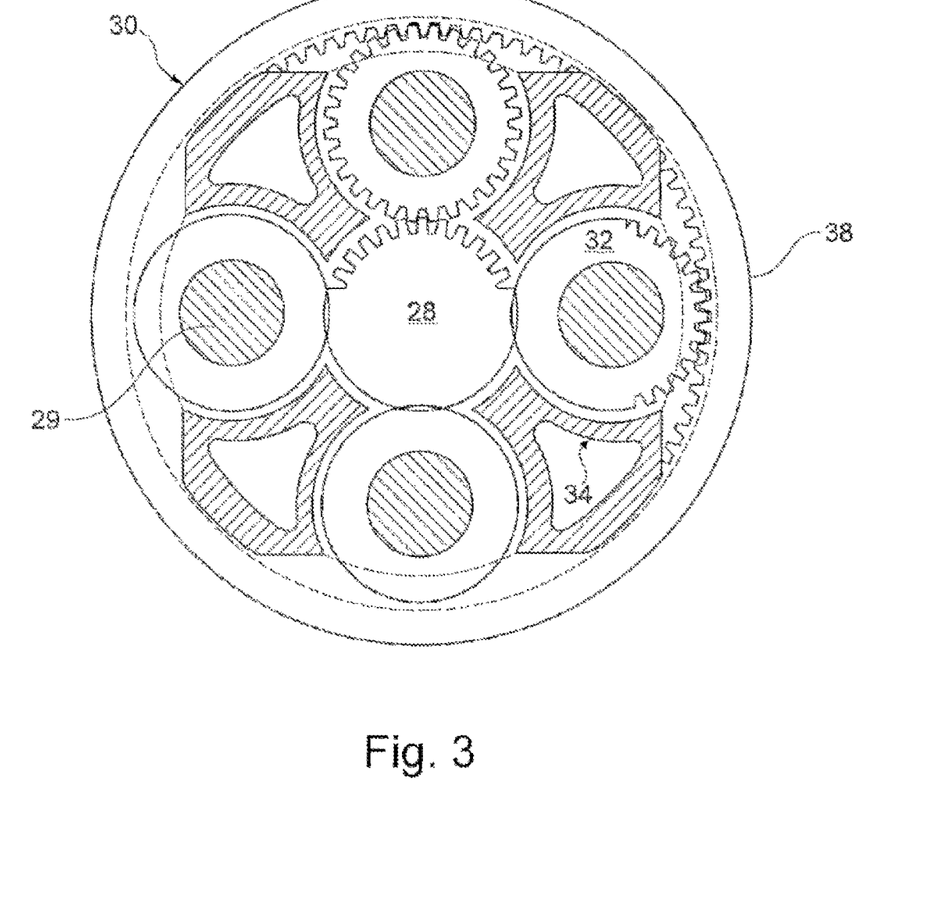
FIG. 3 shows an isolated illustration of a gearbox for a gas turbine engine.

The epicyclic gearbox 30 is shown in greater detail by way of example in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 can be provided within the scope of protection of the claimed invention. Practical applications of an epicyclic gearbox 30 generally comprise at least three planet gears 32.

The epicyclic gearbox 30 illustrated by way of example in FIGS. 2 and 3 is of the planetary type, in which the planet carrier 34 is coupled to an output shaft via linkages 36, wherein the ring gear 38 is fixed. However, any other suitable type of epicyclic gearbox 30 can be used. By way of a further example, the epicyclic gearbox 30 can be a star arrangement, in which the planet carrier 34 is held so as to be fixed, with the ring gear (or annulus) 38 allowed to rotate. In the case of such an arrangement, the fan 23 is driven by the ring gear 38. By way of a further alternative example, the gearbox 30 can be a differential gearbox in which the ring gear 38 and the planet carrier 34 are both allowed to rotate.

It will be appreciated that the arrangement shown in FIGS. 2 and 3 is only exemplary, and various alternatives are within the scope of protection of the present disclosure. Purely by way of example, any suitable arrangement can be used for positioning the gearbox 30 in the engine 10 and/or for connecting the gearbox 30 to the engine 10. By way of a further example, the connections (such as the linkages 36, 40 in the example of FIG. 2) between the gearbox 30 and other parts of the engine 10 (such as the input shaft 26, the output shaft and the fixed structure 24) can have a certain degree of stiffness or flexibility. By way of a further example, any suitable arrangement of the bearings between rotating and stationary parts of the engine (for example between the input and output shafts of the gearbox and the fixed structures, such as the gearbox casing) can be used, and the disclosure is not limited to the exemplary arrangement of FIG. 2. For example, where the gearbox 30 has a star arrangement (described above), the person skilled in the art would readily understand that the arrangement of output and support linkages and bearing positions would usually be different than that shown by way of example in FIG. 2.

Accordingly, the present disclosure extends to a gas turbine engine having an arbitrary arrangement of gearbox types (for example star-shaped or planetary), support structures, input and output shaft arrangement, and bearing positions.

Optionally, the gearbox may drive additional and/or alternative components (e.g. the intermediate-pressure compressor and/or a booster compressor).

Other gas turbine engines to which the present disclosure can be applied may have alternative configurations. For example, engines of this type may have an alternative number of compressors and/or turbines and/or an alternative number of connecting shafts. By way of further example, the gas turbine engine shown in FIG. 1 has a split flow nozzle 20, 22, meaning that the flow through the bypass duct 22 has a dedicated nozzle that is separate from and radially outside the engine core nozzle 20. However, this is not limiting, and any aspect of the present disclosure can also apply to engines in which the flow through the bypass duct 22 and the flow through the core 11 are mixed, or combined, before (or upstream of) a single nozzle, which can be referred to as a mixedflow nozzle. One or both nozzles (whether mixed or split flow) can have a fixed or variable region. While the example described relates to a turbofan engine, the disclosure can be applied, for example, to any type of gas turbine engine, such as an open-rotor engine (in which the fan stage is not surrounded by an engine nacelle) or a turboprop engine.

The geometry of the gas turbine engine 10, and components thereof, is or are defined using a conventional axis system which comprise an axial direction (which is aligned with the axis of rotation 9), a radial direction (in the direction from bottom to top in FIG. 1), and a circumferential direction (perpendicular to the view in FIG. 1). The axial, radial and circumferential directions run so as to be mutually perpendicular.

Figure 4:
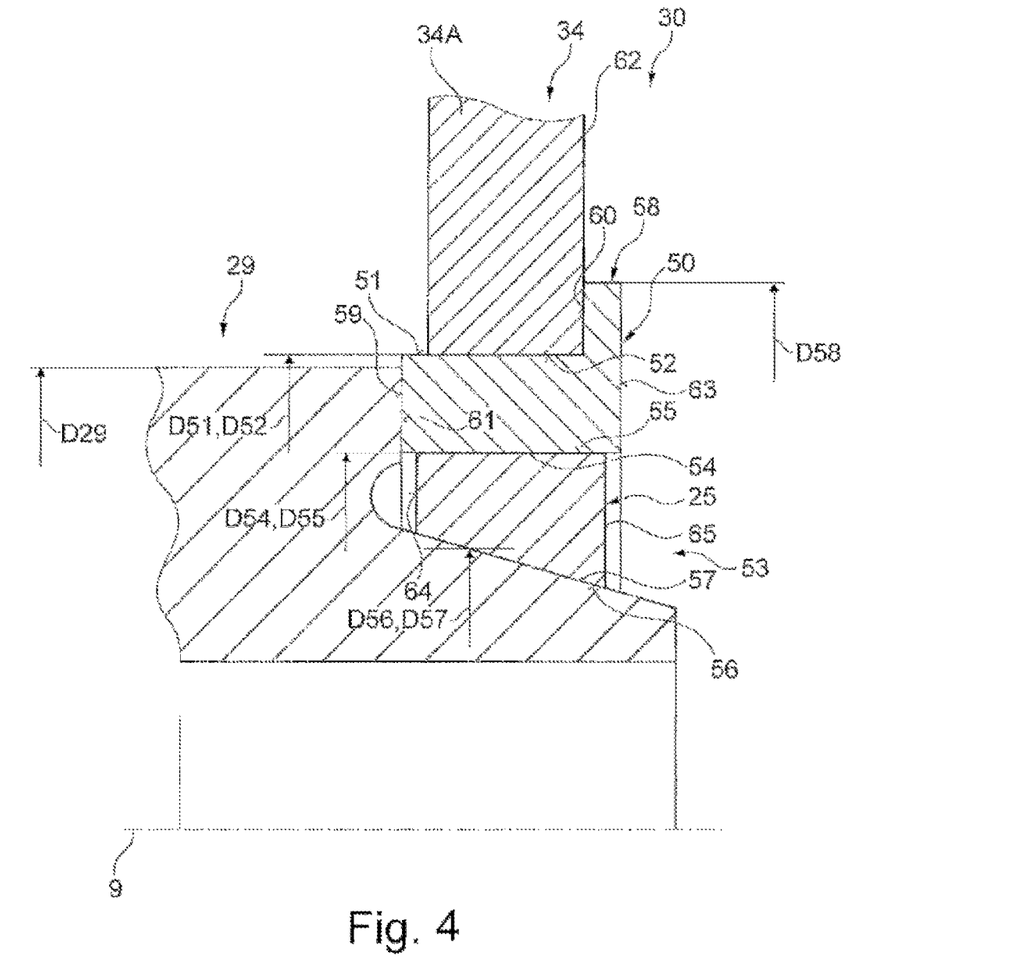
FIG. 4 shows a partial longitudinal section through a planet carrier, a carrier element, a wedging sleeve and a sleeve of the gearbox according to FIG. 3 in the assembled state.

FIG. 4 shows a partial section through the planet carrier 34 or a planet carrier region 34A, a wedging sleeve 25 and the substantially hollow-cylindrical carrier element 29, on which a planet gear 32 can be arranged in a rotatable manner and which is connected to the planet carrier 34 for conjoint rotation therewith by means of the wedging sleeve 25 and a sleeve 50 in the manner described in greater detail below.

The sleeve 50 is arranged radially between the wedging sleeve 25 and the planet carrier region 34A and is operatively connected in some region or regions, by means of an outer side 51, to an inner side 52 of a hole 53 in the planet carrier region 34A. An inner side 54 of the sleeve 50 is, in turn, in engagement with an outer side 55 of the wedging sleeve 25. In addition, the wedging sleeve 25 rests by means of an inner side 56 against an outer side 57 of the carrier element 29.

Provision is made here for each of the planet gears 32 of the planetary gearbox 30 to be arranged rotatably on a separate carrier element 29 and for each carrier element 29 to be operatively connected for conjoint rotation, at the ends, by means of a respective wedging sleeve 25, to planet carrier regions 34A of the planet carrier 34 that are spaced apart from one another in the axial direction of the planetary gearbox 30 and are firmly connected to one another. In the region of their two ends, the carrier elements 29 are of conically tapered design, for example, and interact by means of these end regions, via a respective wedging sleeve 25 and a respective sleeve 50, with the planet carrier regions 34A of the planet carrier 34.

Since the wedging sleeves 25, the respective planet carrier regions 34A of the planet carrier 34 which interact therewith, and the carrier elements 29 are of substantially identical design in the exemplary embodiment illustrated in FIG. 4, the construction of the planetary gearbox 30 and the production of the joint for conjoint rotation between the carrier elements 29 and the planet carrier 34 will first of all be explained in greater detail with reference to the illustration in FIG. 4.

The profile of the inside diameter D56 of the inner side 56 of the wedging sleeve 25 and the profile of the outside diameter D57 of the outer side 57 of the carrier element 29 are matched to one another in such a way that there is an interference fit in the region of overlap between the tapered inner side 56 of the wedging sleeve 25 and the tapered or conical outer side 57 of the carrier element 29 in the fully fitted operating state of the wedging sleeve 25. Here, the interference fit is such that a joint for conjoint rotation is established in all cases between the carrier element 29 and the planet carrier 34 by the wedging sleeve 25.

In addition, the profile of the outside diameter D51 of the outer side 51 of the sleeve 50, said outer side being of cylindrical design in the present case, and the profile of the inside diameter D52 of the inner side 52 of the planet carrier region 34A, said inner side likewise being of cylindrical design, are matched to one another in such a way that in the fully fitted operating state of the sleeve 50 in the region of overlap between the planet carrier region 34A and the sleeve 50, there is an interference fit, wherein the interference fit in this region is less than the interference fit between the wedging sleeve 25 and the carrier element 29.

The sleeve 50 has a radially outward-pointing annular collar 58, the outside diameter D58 of which is greater than the diameter D52 of the inner side 52 of the planet carrier region 34A, to which the outer side 51 of the sleeve 50 is operatively connected. Thus, there is also a region of overlap between the sleeve 50 and the planet carrier region 34A in the radial direction.

In the exemplary embodiment illustrated in FIG. 4, an axial distance between an end 59 of the sleeve 50 and an end 60, facing the planet carrier region 34A, of the annular collar 58 of the sleeve 50 is designed in such a way that the sleeve rests with no play or as far as possible with no play by means of its end face 59 against an end 61 of the carrier element 29 and, at the same time, the end 60 rests with no play or as far as possible with no play against a side face 62 of the planet carrier region 34A.

This ensures that when the wedging sleeve 25 is installed between the sleeve 50 and the carrier element 29, the force flow of the fitting force is closed both by the planet carrier 34 and by the carrier element 29, and unwanted bending of the planet carrier region 34A is limited or completely avoided.

As a departure therefrom, there is also the possibility that the axial distance between the end 59 and the side face 60 is such that the sleeve 50 rests without play by means of its end 59 against the end 61 of the carrier element 29, while the side face 60 of the annular collar 58 is spaced apart slightly from the side face 62 of the planet carrier region 34A in the axial direction.

An outside diameter D29 of the carrier element 29 is less than the inside diameter D52 of the inner side 52 of the planet carrier region 34A, thereby enabling the carrier element 29 to be arranged to the desired extent between the two planet carrier regions 34A in some region or regions, even in the case of a one-piece embodiment of the planet carrier 34.

Figure 4A:
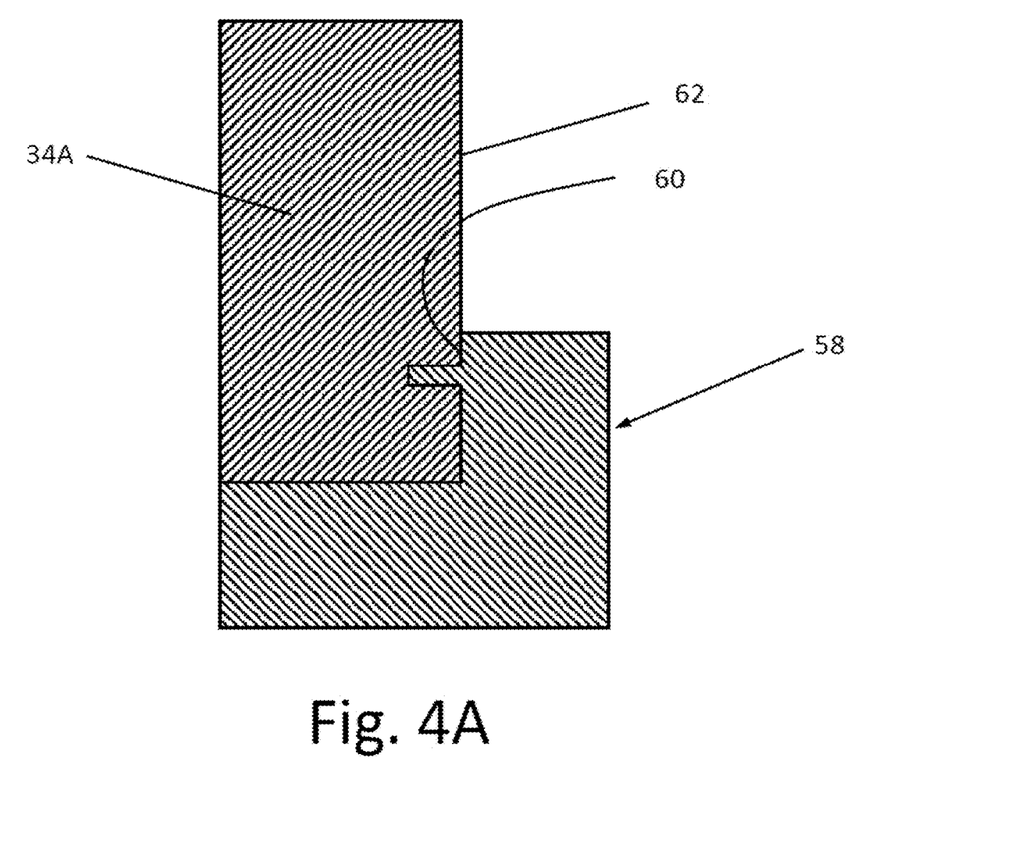

FIG. 4A shows a positive engagement between the end 60 of the annular collar 58 and the side face 62 of the planet carrier region 34A, wherein the positive engagement at least partially blocks a relative rotary motion between the planet carrier region 34A and the sleeve 50.

Moreover, there is also the possibility that the sleeve 50 is formed without the annular collar 58, and the sleeve 50 is embodied with a constant outside diameter D51 between the end 59 and its opposite end 63.

Figure 5:
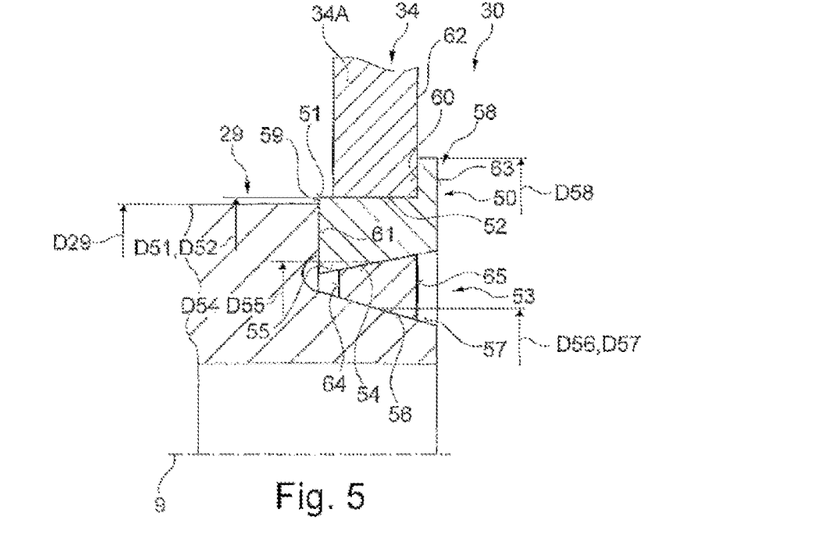
FIG. 5 shows an illustration corresponding to FIG. 4 of the planet carrier, the carrier element, the sleeve and the wedging sleeve, wherein an inner side of the sleeve and an outer side of the wedging sleeve are of tapered design.
Figure 6:
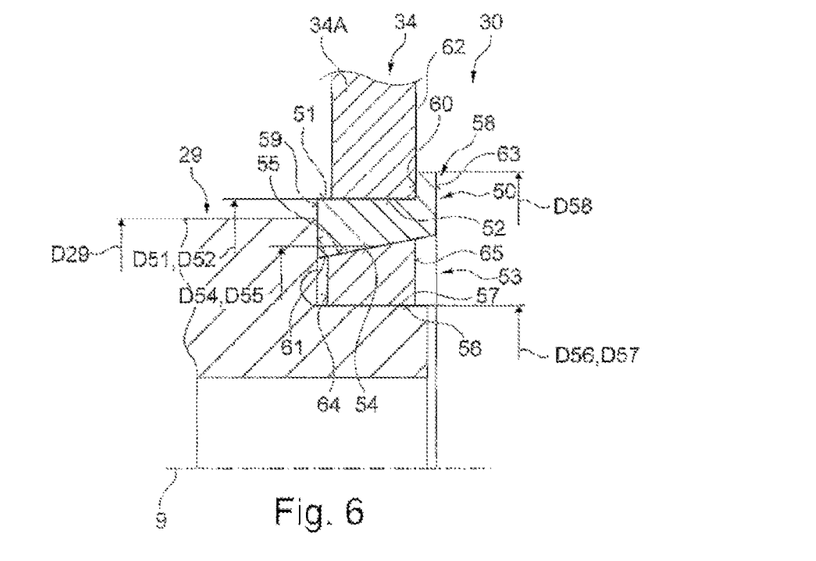
FIG. 6 shows an illustration corresponding to FIG. 4 of the planet carrier, the carrier element, the sleeve and the wedging sleeve, wherein an inner side of the wedging sleeve and an outer side of the carrier element are of at least approximately cylindrical design.
Figure 7:
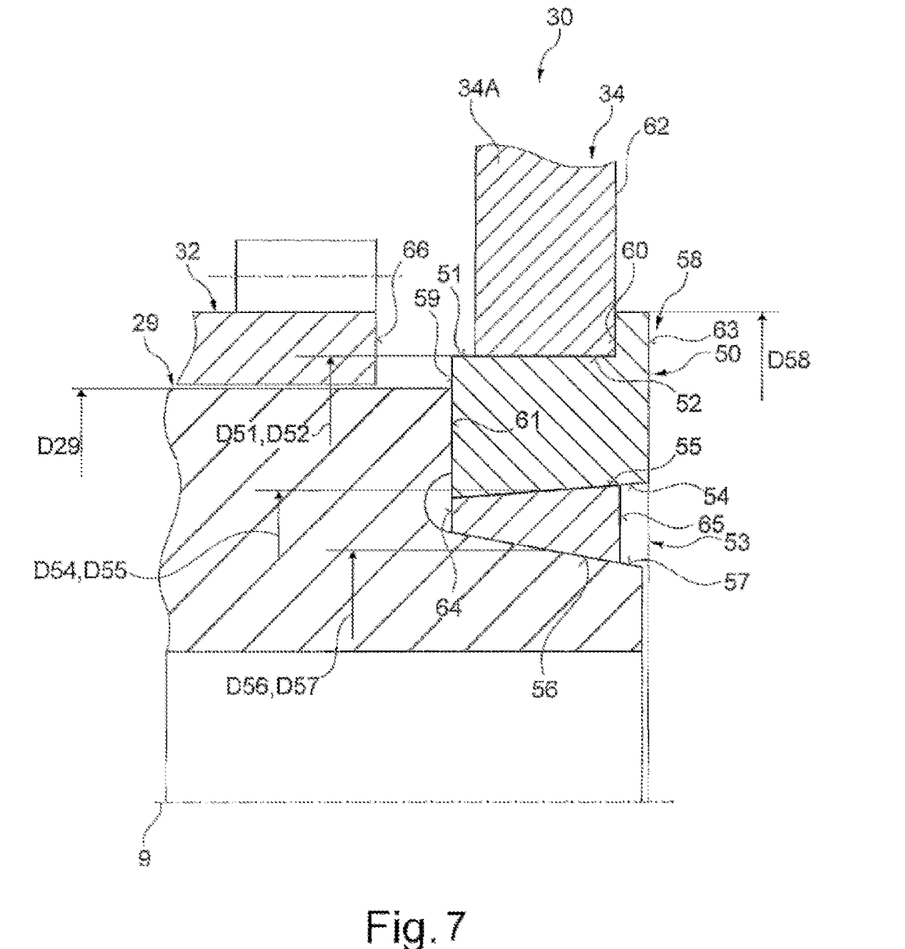
FIG. 7 shows an illustration corresponding to FIG. 4 of the planet carrier, the carrier element, the sleeve and the wedging sleeve, wherein the sleeve is formed with a non-sparking material in an end face facing the carrier element.

FIG. 5 to FIG. 7 show further embodiments of the planetary gearbox device 30, each illustrated in a manner corresponding to FIG. 4. In the following description, in each case only the differences with respect to the embodiment of the planetary gearbox device 30 shown in FIG. 4 are explored, and attention is drawn to the description associated with FIG. 4 for additional details of the way in which the planetary gearbox device 30 operates.

In the embodiment of the planetary gearbox device 30 according to FIG. 5, both the inner side 56 of the wedging sleeve 25 and the outer side 55 thereof are of tapered or conical design, wherein the outside diameter D55 and the inside diameter D56 of the wedging sleeve 25 increase continuously, starting from the end 64 facing the carrier element 29, in the direction of the opposite end 65. Thus, it is a simple matter to insert the wedging sleeve 25 between the outer side 57 of the carrier element 29 and the inner side 54 of the sleeve 50, said inner side likewise being of tapered or conical design, in order to establish the joint for conjoint rotation between the carrier element 29 and the planet carrier 34.

As a departure therefrom, only the outer side 55 of the wedging sleeve 25 is of tapered or conical design, while the inner side 56 of the wedging sleeve 25 is of cylindrical design in the planetary gearbox device 30 according to FIG. 6.

In the embodiment of the planetary gearbox device 30 which is shown in FIG. 7, the outside diameter D51 of the outer side 51 of the sleeve 50 is greater than the outside diameter D29 of the carrier element 29 by a defined amount. At least in the annular surface region of the end face 59 which is not in contact with the end 61 of the carrier element 29, the end 59 of the sleeve 50 is embodied with a material which does not produce any sparks in the event of frictional contact with an end 66 of the planet gear 32 which faces the sleeve 50. The ignition of inflammable fluid in the region of the planetary gearbox device 30 is thereby avoided. In addition, a friction coefficient of the material in this region of the end 59 of the sleeve 50 is low, and therefore the planet gear 32 is braked to only a small extent when the end 66 of the planet gear 32 is in contact with the end 59 of the sleeve 50.

Figure 8:
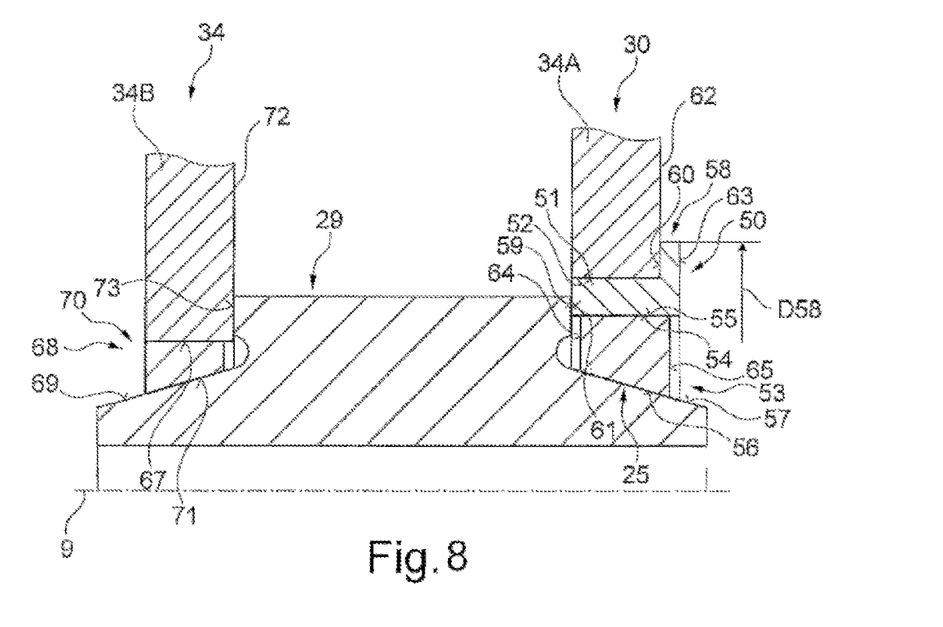
FIG. 8 shows a highly schematized partial illustration of the planet carrier, the carrier element, the sleeve and two wedging sleeves in the fully assembled state, in which a joint for conjoint rotation between the planet carrier and the carrier element is established by means of the wedging sleeves.

In addition to the planet carrier region 34A, FIG. 8 shows a further planet carrier region 34B of the planet carrier 34, which is spaced apart from the former region in the axial direction and in which the carrier element 29 is arranged. In order to establish a joint for conjoint rotation between the planet carrier region 34B and the carrier element 29 too, a further wedging sleeve 70 is inserted between an inner side 67 of a hole 68 in the planet carrier region 34B and an outer side 69 of the carrier element 29. For this purpose, a corresponding interference fit is provided between an inner side 71 of the further wedging sleeve 70 and the outer side 69 of the carrier element 29.

In the region of its inner side face 72, the planet carrier region 34B rests without play against an end 73 of the carrier element 29. As a result, the fitting force applied during the process of fitting the further wedging sleeve 70 between the planet carrier region 34B and the carrier element 29 is introduced into the planet carrier region 34B and supported to the desired extent by the carrier element 29, and deformations and bending in the axial direction of the carrier element 29 in the region of the planet carrier region 34B during the installation of the further wedging sleeve 70 are avoided in a manner which is simple in terms of design.

Figure 9:
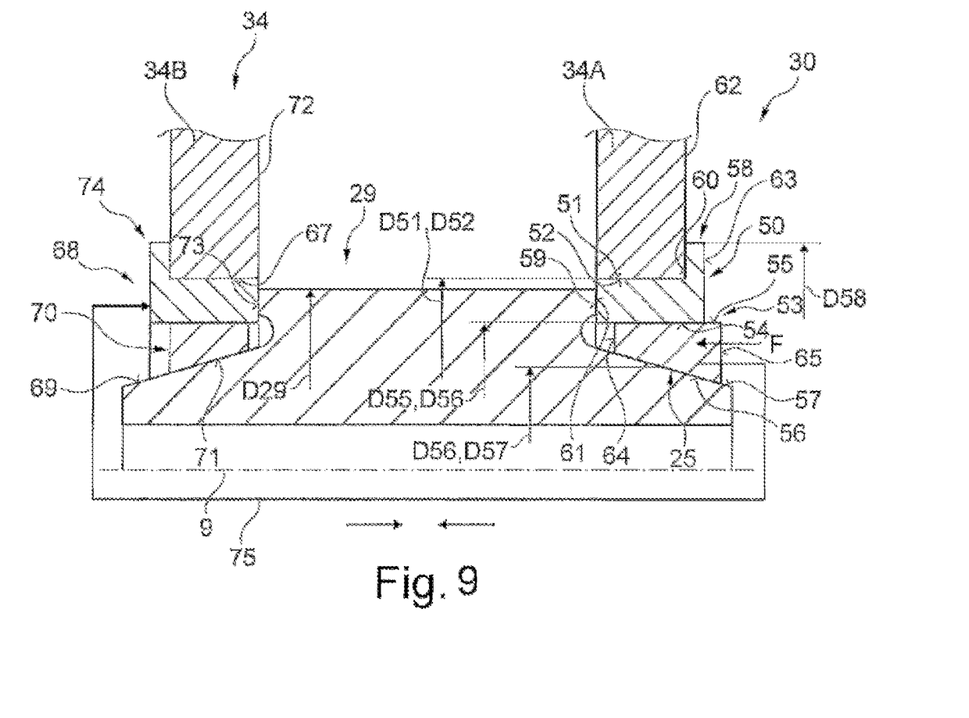
FIG. 9 shows an illustration corresponding to FIG. 8 of the planet carrier, the carrier element, the sleeve, a further sleeve and the wedging sleeves, wherein one of the wedging sleeves is shown only in the partially installed state.

As a departure therefrom, it is also possible in the embodiment of the planetary gearbox device 30 illustrated in FIG. 9 for a further sleeve 74 to be arranged between the further wedging sleeve 70 and the planet carrier region 34B, the design embodiment of said further sleeve corresponding substantially to the design configuration of the sleeve 50 according to FIG. 4 and merely being designed as a mirror image of the latter. In FIG. 9, the further sleeve 74 is shown in its fully installed state, while the sleeve 50 is not yet in its fully fitted position.

As a departure, in turn, from the latter, there is the possibility in a further embodiment of the planetary gearbox device 30 of providing for the sleeve 50 to be already in its fully fitted end position in the situation illustrated in FIG. 9 and, in this situation, for it to project beyond the outer side 62 of the planet carrier region 34B and the end 63 of the sleeve 50 in the axial direction.

During the installation of the sleeve 50, said sleeve is subjected to the fitting force F in the axial direction or direction of insertion in the region of its end 63. The planet carrier region 34A is supported in the region of the end 61 facing away from the end 73 of the carrier element 29. Unwanted deformations of the planet carrier 34 or in the region of the two planet carrier regions 34A and 34B are thereby avoided.

The arrangement of the sleeve 50 and/or of the further sleeve 74 in the holes 53 and 68 of the planet carrier regions 34A and 34B, respectively, offers the possibility of removing the planetary gearbox device 30 without imposing any significant load on the planet carrier 34 during maintenance of the gas turbine engine 10. This is due to the fact that, when the carrier element 29 is removed, only the wedging sleeves 25 and 70 have to be guided out of engagement with the carrier element 29 and the sleeves 50 and 74. Following this, the sleeves 50 and 74, which are each arranged with a significantly smaller interference fit in the planet carrier 34, must be removed from the planet carrier regions 34A and 34B, for which purpose significantly lower release forces have to be applied.

If damage is nevertheless caused in the region of the inner side 52 and 67 of the holes 53 and 68 during the removal of the sleeves 50 and 74, this can be remedied in a simple manner by appropriate re-machining of the inner sides of the holes 53 and 68 of the planet carrier regions 34A and 34B and subsequently arranging an appropriately adapted sleeve with little effort in each of the planet carrier regions 34A and 34B.

It is thereby possible with little effort to extend the service life of the planet carrier 34, which is characterized by high production costs in comparison with the other components of the planetary gearbox device 30.

Moreover, the use of the sleeves 50 and 74 additionally offers the possibility of compensating deviations, caused by manufacturing inaccuracies, between a predefined position of the holes 53 and 68 in the planet carrier regions 34A and 34B and a predefined position by appropriately adapted production of the outer sides 51 and/or of the inner sides 54 of the sleeves 50 and 74. This makes it possible to improve the tooth engagements between the planet gears 34 of the planetary gearbox device 30, the sun gear 28 and the ring gear 38, and this, in turn, has a positive effect on the service life of the planetary gearbox device 30. In addition, this also gives rise to the possibility of embodying the components of the planetary gearbox device 30 with a lower strength, thereby making it possible to embody the planetary gearbox device 30 with a low dead weight.

LIST OF REFERENCE SIGNS

9 Primary axis of rotation
10 Gas turbine engine
11 Core
12 Air intake
14 Low-pressure compressor
15 High-pressure compressor
16 Combustion installation
17 High-pressure turbine
18 Bypass thrust nozzle
19 Low-pressure turbine
20 Core thrust nozzle
21 Engine nacelle
22 Bypass duct
23 Fan
24 Support structure
25 Wedging sleeve
26 Shaft, core shaft
27 Shaft
28 Sun gear
29 Carrier element
30 Gearbox, planetary gearbox device
32 Planet gear
34 Planet carrier
34A, 34B Planet carrier region
36 Linkage
38 Ring gear
40 Linkage
50 Sleeve
51 Outer side of the sleeve
52 Inner side of the hole in the planet carrier region 34A
53 Hole in the planet carrier region 34A
54 Inner side of the sleeve 50
55 Outer side of the wedging sleeve 25
56 Inner side of the wedging sleeve 25
57 Outer side of the carrier element 29
58 Annular collar of the sleeve 50
59 End of the sleeve 50
60 End of the annular collar 58
61 End of the carrier element 29
62 Side face
63 End of the sleeve 50
64 End of the wedging sleeve 25
65 End of the wedging sleeve 25
66 End of the planet gear 32
67 Inner side of the planet carrier region 34B
68 Hole in the planet carrier region 34B
69 Outer side of the carrier element 29
70 Further wedging sleeve
71 Inner side of the further wedging sleeve 70
72 Inner side face of the planet carrier region 34B
73 End of the carrier element 29
74 Further sleeve
75 Line A Core air flow
B Bypass air flow
D29 Outside diameter of the carrier element 29
D51 Outside diameter of the outer side 51 of the sleeve 50
D52 Inside diameter of the inner side 52 of the planet carrier region 34A
D55 Outside diameter of the outer side 55 of the wedging sleeve 25
D56 Inside diameter of the inner side 56 of the wedging sleeve 25
D57 Outside diameter of the outer side 57 of the carrier element 29
D58 Outside diameter of the annular collar 58
F Fitting force

The invention claimed is:

1. A planetary gearbox device for a turbomachine, comprising:
a planet carrier including:
two planet carrier regions; and
a carrier element connected to both of the two planet carrier regions for conjoint rotation about an axis of rotation of the carrier element;
at least one planet gear arranged rotatably on the carrier element, wherein the at least one planet gear is arranged between the two planet carrier regions in an axial direction with respect to the axis of rotation;
a wedging sleeve including, at least partially, a wedge shape wedged between the carrier element and one of the two planet carrier regions to force the carrier element and the one of the two planet carrier regions into a press-fit connection;
a sleeve located radially between the wedging sleeve and the one of the two planet carrier regions with respect to the axis of rotation.

2. The planetary gearbox device according to claim 1, wherein the wedging sleeve includes an outer side, wherein the outer side is operatively connected to an inner side of the sleeve, at least in some region or regions, and wherein the outer side of the wedging sleeve and the inner side of the sleeve are matched to one another.

3. The planetary gearbox device according to claim 2, wherein the inner side of the sleeve is of tapered or cylindrical shape, at least in some region or regions.

4. The planetary gearbox device according to claim 1, wherein the wedging sleeve includes an inner side, wherein the inner side is operatively connected to an outer side of the carrier element, at least in some region or regions, wherein the inner side of the wedging sleeve and the outer side of the carrier element are matched to one another.

5. The planetary gearbox device according to claim 4, wherein the wedging sleeve includes the inner side, and wherein at least one chosen from the outer side and the inner side of the wedging sleeve is of tapered or cylindrical shape, at least in some region or regions.

6. The planetary gearbox device according to claim 1, wherein an outer side of the sleeve is operatively connected to an inner side of the one of the two planet carrier regions, at least in some region or regions.

7. The planetary gearbox device according to claim 6, wherein an outside diameter of the outer side of the sleeve and an inside diameter of the inner side, interacting with the sleeve, of the one of the two planet carrier regions, are matched to one another in such a way that there is an interference fit between the sleeve and the one of the two planet carrier regions before an installation of the wedging sleeve between the sleeve and the carrier element.

8. The planetary gearbox device according to claim 1, wherein the sleeve includes an end face, wherein the carrier element includes an end face, wherein an outside diameter of the end face of the sleeve is greater than a diameter of the end face of the carrier element, and wherein at least a surface region of the end face of the sleeve which radially surrounds the end face of the carrier element is embodied with a non-sparking material.

9. The planetary gearbox device according to claim 8, wherein the sleeve includes a radially outward-pointing annular collar, and wherein an outside diameter of the radially outward-pointing annular collar is greater than a diameter of an inner side of the one of the two planet carrier regions, to which an outer side of the sleeve is operatively connected.

10. The planetary gearbox device according to claim 9, wherein an end face of the annular collar which faces a side face of the one of the two planet carrier regions rests against the side face of the one of the two planet carrier regions.

11. The planetary gearbox device according to claim 10, wherein at least in some region or regions, between the end of the annular collar and the side face of the one of the two planet carrier regions, a positive engagement at least partially blocks a relative rotary motion between the one of the two planet carrier regions and the sleeve.

12. The planetary gearbox device according to claim 1, wherein an end face of the sleeve rests against an end face of the carrier element between the two planet carrier regions, at least in some region or regions.

13. The planetary gearbox device according to claim 1, further comprising:
a further wedging sleeve and a further sleeve;
wherein, at least in some region or regions, an outer side of the further wedging sleeve is operatively connected to one chosen from an inner side of the further sleeve and directly to an inner side of another of the two planet carrier regions; and
wherein the outer side of the further wedging sleeve and the one chosen from the inner side of the further sleeve and the inner side of the other of the two planet carrier regions are matched to one another.

14. The planetary gearbox device according to claim 13, wherein the one chosen from the inner side of the further sleeve and the inner side of the other of the two planet carrier regions is of tapered or cylindrical shape, at least in some region or regions.

15. The planetary gearbox device according to claim 1, wherein the planet carrier is one chosen from a one-piece and a multi-part configuration.

16. A gas turbine engine for an aircraft including the planetary gearbox device according to claim 1, and further comprising:
an engine core, including a turbine, a compressor, and a shaft, wherein the shaft connects the turbine to the compressor;
a fan, wherein the fan is positioned upstream of the engine core, and wherein the fan includes a plurality of cores; and
wherein the planetary gearbox receives an input from the shaft and outputs drive for the fan in order to drive the fan at a lower speed than the shaft.

17. The gas turbine engine according to claim 16,
wherein the turbine is a first turbine, the compressor is a first compressor, and the shaft is a first shaft;
wherein the engine core further comprises a second turbine, a second compressor, and a second shaft, which connects the second turbine to the second compressor; and
wherein the second turbine, the second compressor and the second shaft are arranged so as to rotate at a higher speed than the first shaft.

18. A method for producing a planetary gearbox device comprising:
providing:
a planet carrier including:
two planet carrier regions; and
a carrier element connected to both of the two planet carrier regions for conjoint rotation about an axis of rotation of the carrier element;
at least one planet gear arranged rotatably on the carrier element, wherein the at least one planet gear is arranged between the two planet carrier regions in an axial direction with respect to the axis of rotation;
a wedging sleeve including, at least partially, a wedge shape wedged between the carrier element and one of the two planet carrier regions to force the carrier element and the one of the two planet carrier regions into a press-fit connection;
a sleeve located radially between the wedging sleeve and the one of the two planet carrier regions with respect to the axis of rotation; and
determining a position of an inner side of the one of the two planet carrier regions and, if a deviation between the position determined and a predefined position is detected, at least one chosen from an inner side of the sleeve and an outer side of the sleeve is produced in accordance with the deviation.

\* \* \* \* \*